United States Patent [19]

Kamins et al.

[11] Patent Number: 5,086,113

[45] Date of Patent: * Feb. 4, 1992

[54] THERMOPLASTIC BLENDS OF ABS CONTAINING ETHYLENE TERPOLYMERS

[75] Inventors: Kathryn A. Kamins, Hockessin, Del.; Robert J. Statz, Kennett Square, Pa.

[73] Assignee: E. I. Du Pont de Nemours & Company, Wilmington, Del.

[*] Notice: The portion of the term of this patent subsequent to Jan. 15, 2008 has been disclaimed.

[21] Appl. No.: 618,503

[22] Filed: Nov. 28, 1990

Related U.S. Application Data

[63] Continuation-in-part of Ser. No. 236,441, Aug. 25, 1988, Pat. No. 4,985,497.

[51] Int. Cl.$^5$ .................... C08L 55/02; C08L 101/06
[52] U.S. Cl. ....................... 525/84; 525/83; 525/190
[58] Field of Search ............... 525/84, 83, 190

[56] References Cited

U.S. PATENT DOCUMENTS

| | | | |
|---|---|---|---|
| 3,780,140 | 12/1973 | Hammer | 525/185 |
| 4,172,859 | 10/1979 | Epstein | 525/187 |
| 4,613,533 | 8/1986 | Loomis et al. | 524/296 |

*Primary Examiner*—Melvyn I. Marquis
*Assistant Examiner*—Thomas Hamilton, II

[57] ABSTRACT

Terpolymers of various amounts of polymer repeat units of ethylene, ethyl acrylate, and carbon monoxide are intimately admixed with acrylonitrile/butadiene/styrene (ABS) resin to form a blend with a flex modulus of at least 1700 MPa. The resulting blend has enhanced impact strength properties over the resin alone. Such blends are useful as molding resins. The process for preparation of the blend involves admixing the terpolymer with the ABS resin.

4 Claims, No Drawings

THERMOPLASTIC BLENDS OF ABS CONTAINING ETHYLENE TERPOLYMERS

CROSS-REFERENCE TO RELATED APPLICATION

This Application is a continuation-in-part of U.S. Application Ser. No. 07/236,441, filed Aug. 25, 1988 now issued as U.S. Pat. No. 4,985,497.

FIELD OF THE INVENTION

This invention relates to ethylene terpolymers and compositions and shaped articles formed therefrom. More particularly, this invention relates to terpolymers of polymer repeat units of ethylene, ethyl acrylate and carbon monoxide, wherein the terpolymers are blended together with acrylonitrile/butadiene/styrene (ABS) resins to enhance the physical properties of the resin, and to processes for preparing such blends.

BACKGROUND OF THE INVENTION

Commercially available plastics have been found to be useful because of the high rigidity of objects molded therefrom. However, this rigidity is often accompanied by brittleness or lack of toughness. Several blends of stiff polymers with other polymers have been made to improve the toughness of stiff polymers. One set of these blends involves mixing a stiff polymer with a soft, often rubbery polymer that is miscible with the stiff polymer on a molecular level. This produces a plasticized material that is essentially in one phase. However, this type of blend is almost always designed to produce flexible materials having reduced stiffness and lower heat resistance. Another set of polymer blends is prepared by combining a stiff polymer with certain polymers that are immiscible with it, creating a phase structure. The stiff polymer is typically a continuous phase, throughout which a soft polymer is located in a dispersed phase. A continuum of thermoplastic polymers with varying degrees of toughness is developed, depending on the amount of stiff polymer and soft polymer present. Another blend of polymers designed to increase toughness (such as already toughened ABS) is prepared by recycling degraded ABS and blending the recycled product with higher impact ABS. However, degraded ABS is often oxidized and crosslinked, and exhibits low flow which is detrimental to processing operations. Furthermore, ABS in general has poor weatherability characteristics (it ages and becomes embrittled at room temperature) and it thermally degrades due to processing heat. Blending in more ABS with the degraded ABS does not correct these deficiencies. In contrast, in the present invention a terpolymer not containing polybutadiene can be mixed with degraded ABS. Because a polymer with good weatherability has been added rather than the easily degradable polybutadiene, a longer lasting, toughened ABS may be formed.

U.S. Pat. No. 3,780,140 to Hammer discloses a polymer of ethylene, carbon monoxide and one or more monomers to produce solid products. The resulting polymer may be blended with solid organic polymers to produce flexible films and articles of varying flexibility. The patent recites a long list of solid organic polymers that can be used to produce a blend, including ABS resins. However, the ethylene/carbon monoxide/ter-monomer polymer must be compatible with the solid organic polymer. That is, the two polymers must preferably be miscible on a molecular scale. This suggests a one phase composition that is plasticized. In addition, the focus of this reference is to lower the modulus of the stiff polymer to varying degrees. In contrast, the blend of the present invention is directed to a toughened ABS resin that has a minimal reduction in stiffness and maintains a high modulus.

U.S. Pat. No. 4,613,533 to Loomis et al. describes a partially crosslinked, thermoplastic, elastomeric composition based on compatible blends of an ethylene/ester/carbon monoxide polymer and a vinyl or vinylidene halide polymer. There is no teaching of a composition including ABS resin.

U.S. Pat. No. 4,172,589 to Epstein discloses a toughened multi-phase thermoplastic composition in which one phase includes a polyester matrix resin and polycarbonate matrix resin and at least one other phase includes random copolymers. However, there is no teaching of a toughened ABS resin.

It is an object of the present invention to provide a soft, rubbery terpolymer that acts as an additional toughening agent for ABS resin. It is a further object of this invention to provide a toughened thermoplastic that retains its stiffness. It is yet another object of this invention to develop a toughened thermoplastic that retains a substantial percentage of both the original modulus and the heat distortion temperature (HDT) in a multi-phase polymeric system. These and other objects, features and advantages of the invention will become apparent in the description of the invention that appears below.

SUMMARY OF THE INVENTION

According to this invention, there is provided a toughened multi-phase thermoplastic blend comprising (a) 90-96 weight percent based on total blend of acrylonitrile/butadiene/styrene resin, and (b) 4-10 weight percent based on total blend of a terpolymer comprising 40-79 weight percent of polymer repeat units of ethylene, 15-40 weight percent of polymer repeat units of ethyl acrylate, and 6-20 weight percent of polymer repeat units of carbon monoxide having a melt flow index of 0.1-100 g/10 minutes, the blend having a flex modulus of at least 1700 MPa.

According to another aspect of this invention, there is provided a process for the preparation of a toughened multi-phase thermoplastic blend comprising admixing components (a) and (b) described above, to produce a blend with a flex modulus of at least 1700 MPa.

DETAILED DESCRIPTION OF THE INVENTION

The blend of the present invention has a complex phase structure. Component (a) of the blend, the ABS resin, may exist in any of a variety of configurations and a number of phases. In one configuration, chains of acrylonitrile/styrene copolymers contain branches of polybutadiene. This is the result of grafting polybutadiene directly onto the acrylonitrile/styrene copolymer chains. In the ABS resin, the polybutadiene branches tend to aggregate (but not bond) together. The aggregated polybutadiene may reach sufficient size to form a separate phase. This establishes regions or "pockets" of polybutadiene which may be a distinct phase that coexists with and is interspersed within regions of acrylonitrile/styrene copolymer. The acrylonitrile/styrene copolymer is typically in a continuous phase. A related configuration of ABS wherein the polybutadiene regions are enlarged is developed by supplementing the ABS resin with additional polybutadiene. These resulting ABS copolymers are stiff, due to the containment of the soft polybutadiene in isolated areas and the generally continuous phase of the acrylonitrile/styrene copolymer. Other configurations and phase structures are possible in ABS resins.

It is important to understand that because the configurations of ABS and the variety of phases contained within them are complex, the nature of the interaction of the terpolymer of the present invention with ABS resins is not precisely understood. While various explanations for this interaction are advanced below, they are suggested to assist the reader in understanding the invention, and not to conclusively assert any one explanation as appropriate.

The terpolymer of polymer repeat units of ethylene, polymer repeat units of ethyl acrylate, and polymer repeat units of carbon monoxide is a softer polymer than the ABS resin. It may be a separate phase throughout the complex phase structure of ABS resin, and it constitutes the smaller part of the blend. Moreover, there is always a phase structure throughout the blend, so that there is no appreciable mixing of components on a molecular level which would result in a loss of stiffness. However, there is at least surface compatibility among the phases.

It is important to recognize that ABS may already have a partially gelled or crosslinked butadiene rubber phase. The terpolymer further toughens ABS even though the terpolymer itself probably remains uncrosslinked.

Various intricate patterns and phase structures may exist when the terpolymer is combined with ABS resins. For all of these possible complex configurations, the ABS remains stiff, while the areas of polybutadiene together with the ethylene terpolymer increase the impact resistance of the ABS resin. As a consequence thereof, stiffness is reduced as little as possible while impact resistance is increased as much as possible.

The melt index range (according to ASTM D-1238) for the terpolymer of the toughened multi-phase thermoplastic blend of the present invention is from 0.1 to 100 g/10 min., and preferably from 1 to 50 g/10 min.

The blends of the present invention are useful in a variety of capacities to manufacture a variety of products. In general, these blends have applicability wherever ABS resins are used, and whenever better performance of these resins is desired. Such applications include decorative or structural parts for automobile interiors, instrument or computer housings, light duty gears, and parts for the electrical industry. They may be in the form of self-supporting films or sheets, molded articles, tubing, and the like. The blends are useful whether the ABS resin is virgin (in which case the terpolymer fortifies or supplements the toughening effect of polybutadiene) or regrind (in which case the terpolymer can mix with the embrittled polybutadiene to increase its resistance to age deterioration).

The blends of the present invention may be prepared by conventional techniques known to persons skilled in the art of compounding and extruding polymers. For example, these blends may be prepared by twin screw extrusion, single screw extrusion, intensive mixing, and using a roll mill, among other techniques. It is important when preparing the blend to adequately mix the components, so that the terpolymer is well distributed throughout the ABS resin. The terpolymers according to this invention can be prepared according to the procedure detailed in U.S. Pat. No. 3,780,140, incorporated by reference herein, or variations thereof.

The subject invention will be more fully appreciated with reference to the examples that follows:

EXAMPLES

The blends of the examples were prepared by twin-screw extrusion. A 28 mm twin screw (trilobal) extruder was used to admix ABS with differing levels of various ethylene terpolymers at a melt temperature of 420° F. The ABS used in the Examples and Comparative Example is the commercial product Cycolac DFA 1000R, a medium impact grade of ABS manufactured by General Electric Company. The particular terpolymers used in the examples that illustrate the invention are ethylene/ethyl acrylate/carbon monoxide (abbreviated "E/EA/CO"). Flex bars used to measure critical data in the Examples and Comparative Example were injection molded using a 7 oz. Stokes machine at a melt temperature of 455° F. A notched Izod test to measure impact strength was conducted according to ASTM D-256, at 23° C. Flex modulus was measured according to ASTM D-790. Heat distortion temperature (HDT) was measured according to ASTM D-648 and at 0.455 MPa; samples were annealed overnight in an oven at 70° C. Gardner Impact was measured using ASTM D-4226 Procedure A with an H.25 Impactor.

EXAMPLE 1

A blend of ABS resin, identified as DFA 1000R, was blended in a twin screw extruder at a temperature of 420° F. with 10 weight percent of a terpolymer toughening agent for the ABS resin that comprised, by weight, 44 percent units of ethylene, 38 percent units of ethylene acrylate and 18 percent units of carbon monoxide (E/EA/CO). The terpolymer had a melt flow index of 19.6 g/10 minutes.

The mechanical properties of the resulting blend are given below in Table 1.

TABLE 1

| Notched Izod (J/m) | Gardner Impact (kg · cm) | Flex Modulus (MPa) | HDT @ 66 psi |
|---|---|---|---|
| 279 | 291 | 2123 | 87 |

EXAMPLE 2

The procedure described above in Example 1 was repeated except that the terpolymer toughening agent contained, by weight, 47 percent units of ethylene, 35 percent units of ethyl acrylate, and 18 percent units of carbon monoxide (E/EA/CO). The terpolymer had a melt flow index of 18 2 g/10 minutes.

The mechanical properties of the resulting blend are given below in Table 2.

TABLE 2

| Notched Izod (J/m) | Gardner Impact (kg · cm) | Flex Modulus (MPa) | HDT @ 66 psi |
|---|---|---|---|
| 187 | 199 | 2234 | 90 |

COMPARATIVE EXAMPLE

The procedure described above in Example 1 was substantially repeated except that the terpolymer toughening agent contained, by weight, 34 percent units of ethylene, 50 percent units of ethyl acrylate, and 16 percent units of carbon monoxide. The terpolymer had a melt flow index of 13.8 g/10 minutes.

| Notched Izod (J/m) | Gardner Impact (kg · cm) | Flex Modulus (MPa) | HDT @ 66 psi |
|---|---|---|---|
| 27 | 18 | 2116 | 86 |

Working Examples 1 and 2 show improved toughness of the blends of ABS resin with an E/EA/CO terpolymer falling within the scope of the present invention when compared to the ABS resin in which is incorporated an E/EA/CO terpolymer that falls outside the range called for in the present invention. The Comparative Example shows that there is substantially no toughening effect, as indicated by a low Gardner Impact value, when the ABS resin and a terpolymer having a high level of ethyl acrylate are blended.

We claim:

1. A toughened multi-phase thermoplastic blend comprising:
   (a) 90-96 weight percent based on total blend of acrylonitrile/butadiene/styrene resin; and
   (b) 4-10 weight percent based on total blend of a terpolymer comprising 40-79 weight percent of polymer repeat units of ethylene, about 15-40 weight percent of polymer repeat units of ethyl acrylate, and 6-20 weight percent of polymer repeat units of carbon monoxide having a melt flow index of 0.1-100 g/10 minutes, the blend having a flex modulus of at least 1700 MPa.

2. The blend of claim 1 wherein the terpolymer has a melt flow index of 1 to 50 g/10 min.

3. The blend of claim 1 in the form of a self-supporting film, a self-supported sheet, a molded article, or tubing.

4. Process for the preparation of a toughened multiphase thermoplastic blend comprising admixing 90-96 weight percent based on total blend of acrylonitrile/butadiene/styrene resin, with 4-10 weight percent based on total blend of terpolymer comprising 40-79 weight percent of polymer repeat units of ethylene, 15-40 weight percent of polymer repeat units of ethyl acrylate, and 6-20 weight percent of polymer repeat units of carbon monoxide having a melt flow index of 0.1-100 g/10 minutes, so that the blend has a flex modulus of at least 1700 MPa.

* * * * *